United States Patent [19]

Archambault

[11] Patent Number: 5,118,062
[45] Date of Patent: Jun. 2, 1992

[54] SEAT ATTACHMENT ASSEMBLY

[76] Inventor: Bruno Archambault, 1715 Paton, Sherbrooke, Quebec, Canada, J1J 1C3

[21] Appl. No.: 742,387

[22] Filed: Aug. 8, 1991

Related U.S. Application Data

[63] Continuation-in-part of Ser. No. 628,354, Dec. 17, 1990, abandoned.

[51] Int. Cl.⁵ .................................................. E04G 3/00
[52] U.S. Cl. .................................... 248/285; 248/298; 248/430
[58] Field of Search ................... 248/298, 316.1, 316.3, 248/274, 689, 657, 430, 285; 297/344; 238/215; 296/65.1; 104/246

[56] References Cited

U.S. PATENT DOCUMENTS

| | | | |
|---|---|---|---|
| 4,109,973 | 8/1978 | Terada | 248/430 X |
| 4,555,138 | 11/1985 | Hughes | 296/651 X |
| 4,756,503 | 7/1988 | Fujita | 248/430 |
| 4,863,289 | 9/1989 | Lecerf | 248/430 |
| 4,940,285 | 7/1990 | Suzuki et al. | 248/430 |

Primary Examiner—Ramon O. Ramirez
Attorney, Agent, or Firm—Robic

[57] ABSTRACT

A seat attachment assembly for use to attach a seat onto a vertical wall, preferably but not exclusively the wall of a locomotive driver's cab. The assembly comprises an elongated rail member that can be rigidly fixed in horizontal position onto the vertical wall. The assembly also comprises a seat carrier slidably mounted onto the rail member. The seat carrier comprises a seat-supporting member on which the seat is pivotably mounted about a vertical axis, and a set of supporting arms for mounting the seat-supporting member onto the rail member for horizontal displacement therealong. Rollers are mounted at the free ends of the arms. These rollers bear into the rail member and the vertical wall to vertically support the seat carrier and simultaneously hold the seat-supporting member in a cantilever manner at a given distance away from the vertical wall. Thanks to these rollers, horizontal adjustment of the seat along the vertical wall can easily be achieved without any physical effort.

20 Claims, 5 Drawing Sheets

SEAT ATTACHMENT ASSEMBLY

CROSS-REFERENCE

This application is a continuation-in-part of application Ser. No. 07/628,354 filed on Dec. 17, 1990, now abandoned.

BACKGROUND OF THE INVENTION a) Field of the Invention

The present invention relates to a seat attachment assembly for use to attach a seat onto a vertical wall in such a manner that the position of this seat along the vertical wall may be easily adjusted whenever desired.

The invention also relates to the specific application of this seat attachment assembly to install a seat in a locomotive driver's cab, either directly onto a wall of this cab or onto a seat-supporting rail already fixed to this wall.

b) Brief Description of the Prior Art

It is known that in most of the locomotives of railroad trains presently in operation in North America, at least one seat is mounted onto a horizontal rail fixed onto one of the side walls of the driver's cabin, in such a manner as to be slidably adjustable. The seat which is so mounted, is intended to receive the locomotive's driver or any other person accompanying this driver.

FIG. 1 is a schematic, cross-sectional view of an existing seat-installation assembly for locomotive driver's cabin. As is shown in this Figure, the existing assembly 1' used to attach a seat 3 onto a vertical side wall 5 of the locomotive driver's cabin comprises an horizontal C-shaped rail 7' that is welded or riveted onto the side wall. The assembly also comprises a seat carrier 9' which supports the seat 3 in a cantilever manner at a given distance away from the side wall 5. This seat carrier 9' comprises a seat supporting member 11' provided with a vertical hub 13' in which the seat 3 is pivotably mounted; it also comprises three supporting arms rigidly connected to the seat supporting member 11'. Two of these three arms numbered 15', are symmetrical and project from the member 11' up to the rail 7'.

These two arms 15' have free ends spaced apart from each other, each of these free ends being provided with a metal disk 21' that is sized to slidably fit into the rail 7' and be held therein. The third arm 19' projects from the member 11' down to the side wall 5 and is provided at its free end with a positioning pin 23' sized to fit into any perforations 25' of a line of identical perforations made in the side wall 15, the line extruding under the rail 7' in parallel relationship therewith.

This existing assembly 1' is efficient to attach the seat 3 onto the side wall 5. It also allows adjustment of this seat 3 at different locations along the rail 7', by slightly tilting the seat 3 and seat carrier 9' to disengage the pin 23' from the perforation 25' in which this pin is inserted and then sliding the assembly along the rail 7' up to the location where the seat should stand and another perforation 25' can be found.

In practise however, such an adjustement is not very easy because, most of the time, the disks 21' are jammed into the rail or jam therein when the seat carrier 9' is tilted up to disengage the pin 23'. As a matter of fact, this jamming and the effort to be made to adjust the seat 3 in a locomotive driver's cabin is apparently a major source of back pains.

OBJECT AND SUMMARY OF THE INVENTION

The object of the present invention is essentially to provide a seat attachment assembly of the above mentioned type, which is particularly well adapted for use in a locomotive driver's cabin although it may similarly be used for other applications, and which is free of the above mentioned drawback.

More particularly, the invention as it is broadly claimed hereinafter, lies in a seat attachment assembly for use to attach a seat onto a vertical wall that is preferably but not exclusively the inner wall of a locomotive driver's cab, the assembly comprising:

(a) an elongated rail member,
(b) means for rigidly fixing the rail member in horizontal position onto the vertical wall either directly or via an existing rail already fixed to the vertical wall;
(c) a seat carrier slidably mounted onto the rail member, the seat carrier comprising:
a seat-supporting member on which the seat to be attached is pivotably mounted about a vertical axis, and
means for mounting the seat-supporting member onto the rail member for horizontal displacement therealong at a given distance away from the vertical wall, the mounting means including rollers bearing onto the rail member and onto a vertical surface extending under this rail member, in such a manner as to vertically support the seat and the seat carrier and simultaneously hold the seat-supporting member in a cantilever manner at this given distance away from the vertical wall, and
(d) means for locking the seat carrier to a plurality of different locations along the rail member.

As can be understood, the main feature of this assembly essentially lies in the rollers used to "connect" the seat carrier to the rail member and to the wall, which rollers allow horizontal adjustment of the seat along the vertical wall in a very easy yet efficient manner, without risk of physical injury to do so.

In accordance with the invention, these rollers include a first set of spaced apart rollers each having a longitudinal axis perpendicular to the vertical wall, the rollers of this first set, hereinafter called "horizontal rollers", bearing vertically on the rail member to vertically support the seat and seat carrier. They also include a second set of spaced apart rollers each having a vertical axis, the rollers of this second set, hereinafter called "vertical rollers", including rollers bearing laterally on the rail member and at least one roller bearing on the vertical surface under the rail member to hold the supporting member away from the vertical wall. The vertical surface on which one of the vertical rollers bears may be the vertical wall onto which the rail member is fixed, or a separate supporting wall surface attached directly to this vertical wall or to a related structure, such as the rail member.

Preferably, the rail member has a horizontal rolling surface and a vertical rolling surface facing the vertical wall. Then, the mounting means of the seat carrier preferably comprises three or more supporting arms rigidly connected to the seat-supporting member. Two of these arms project away from the seat-supporting member up to the rail member and have free ends spaced apart from each other and each carrying one of the horizontal rollers and one of the vertical rollers for free rotation over the horizontal and vertical rolling surfaces of the rail member, respectively. The third arm and any other one project away from the seat-supporting member down to the vertical wall and each have a free end carrying one of the vertical rollers for free rotation onto the vertical wall.

As aforesaid, the seat attachment assembly according to the invention can be used to attach a seat onto the vertical wall of a locomotive driver's cab, using the rail supporting an existing seat to do so. The assembly according to the invention can therefore be used in a "retrofit" manner in any existing rail-road equipment.

BRIEF DESCRIPTION OF THE DRAWINGS

The invention and its numerous advantages will be better understood upon reading of the following, nonrestrictive description of a preferred embodiment thereof, given with reference to the accompanying drawings in which.

DESCRIPTION OF A PREFERRED EMBODIMENT

Figure 1:
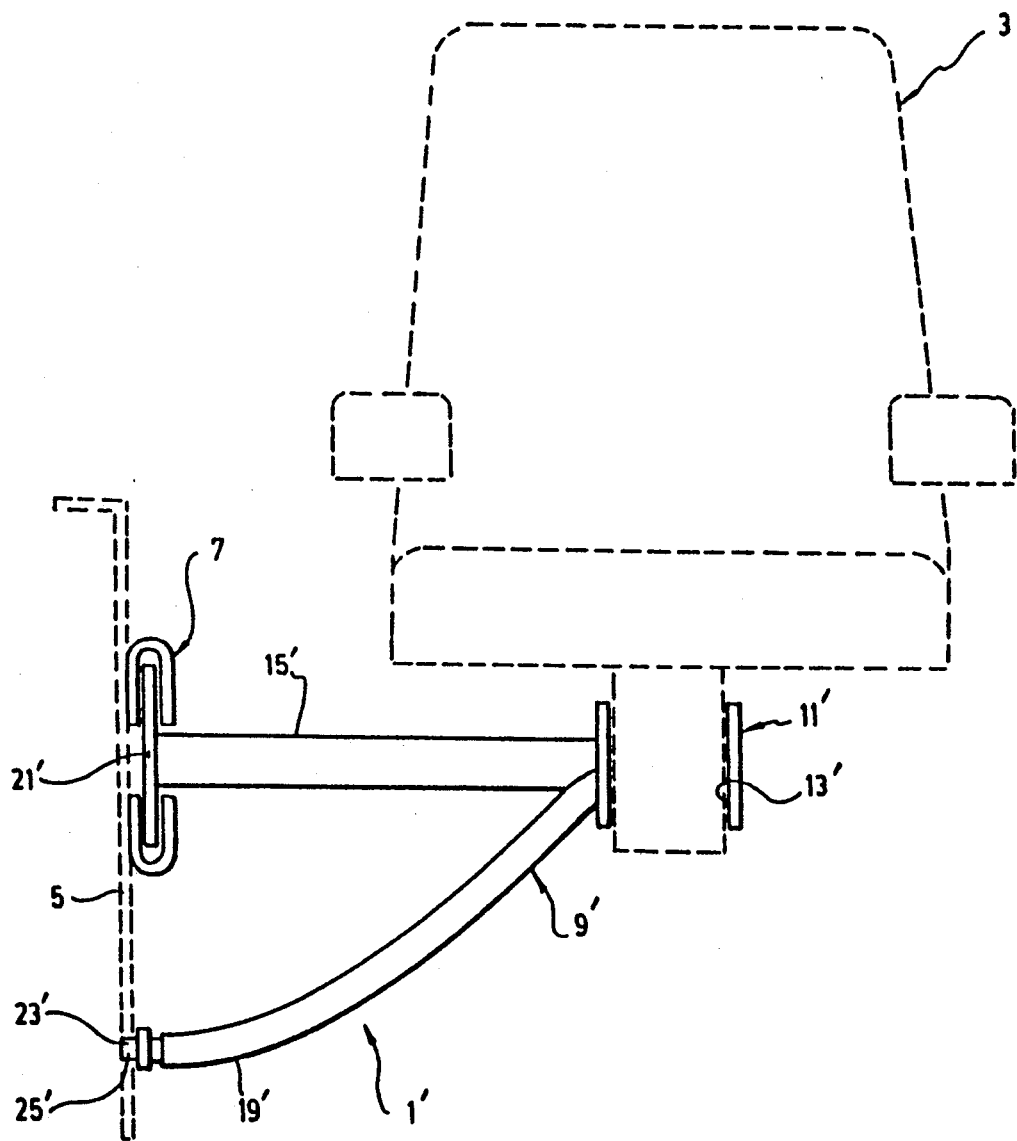
FIG. 1 identified as "prior art", is a schematic cross-sectional view of the seat attachment assembly disclosed in the "Brief Description of the Prior art" hereinabove.
Figure 2:
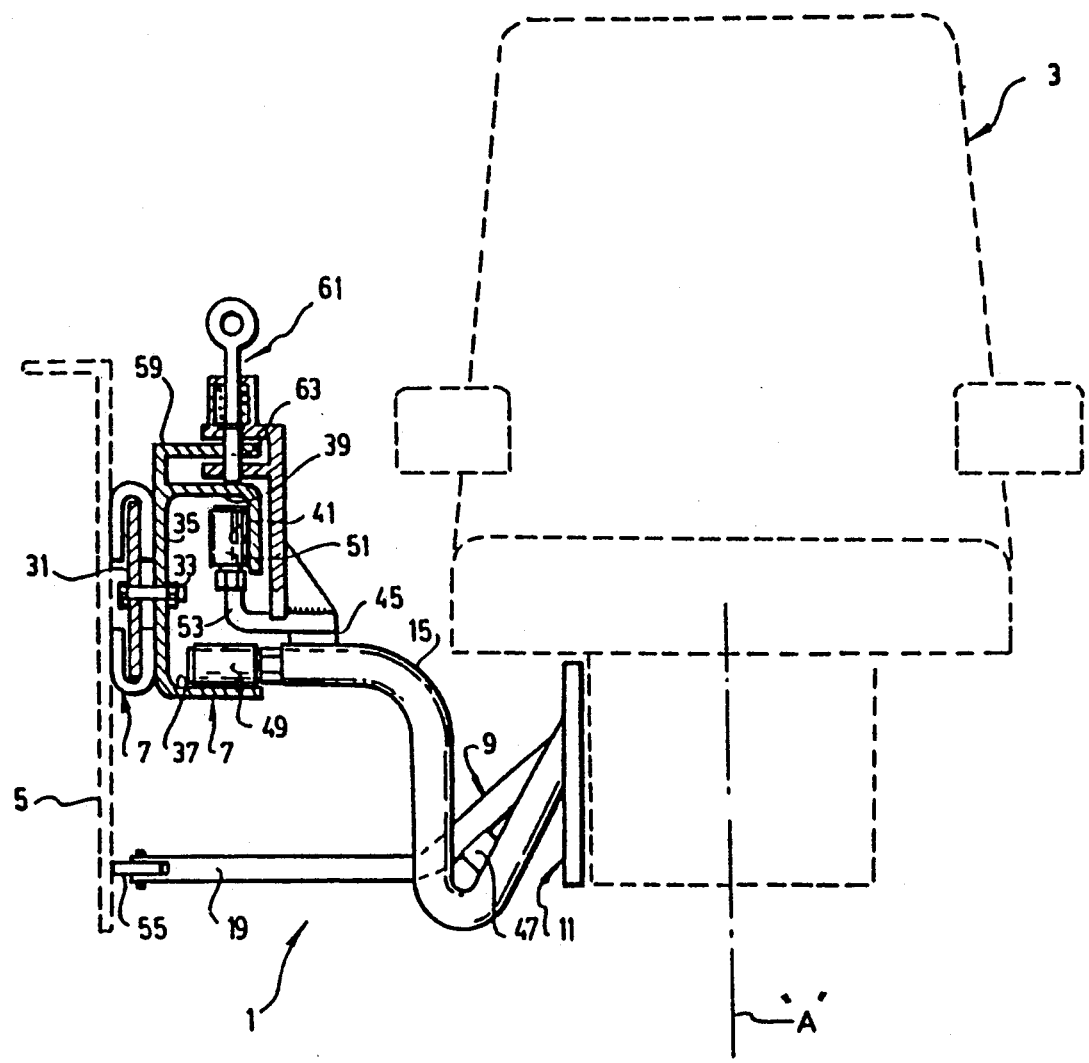
FIG. 2 is a schematic cross-sectional view similar to the one of FIG. 1, showing a seat attachment assembly according to the invention mounted in a retrofit manner onto an existing rail in a locomotive driver's cab.
Figure 3:
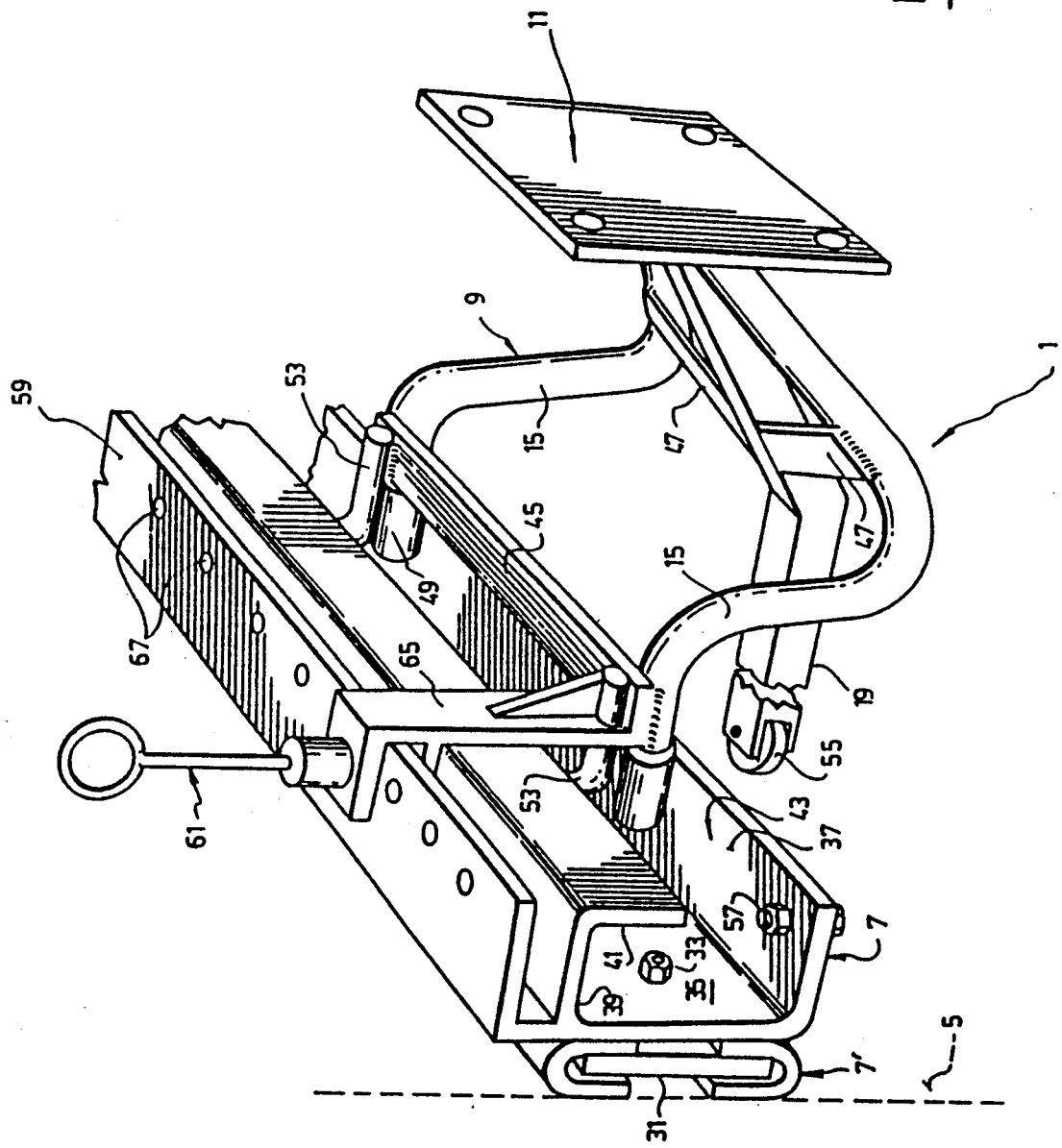
FIG. 3 is a partial perspective view of the assembly shown in FIG. 2.

The seat attachment assembly 1 according to the invention as shown in FIGS. 2 and 3 is intended to be used for attaching a seat 3 onto a vertical wall that can be the same vertical wall 5 as in FIG. 1, i.e. one of the vertical sidewalls of a locomotive driver's cabine.

The assembly 1 comprises an elongated rail member 7 and means for fixing this rail member 7 in horizontal position onto the vertical wall 5. These means may consist of a set of detachable brackets 31 which can be slidably inserted into the rail 7' of an existing installation, and on which the rail 7 can be detachably connected by means of bolt-and-nut assemblies 33.

This way of mounting the rail member 7 onto the existing rail 7' in a locomotive driver's cab is particularly interesting, since it allows easy fixation of the assembly 1 into the driver's cab, without any structural modification to be made within this cab.

Figure 4:
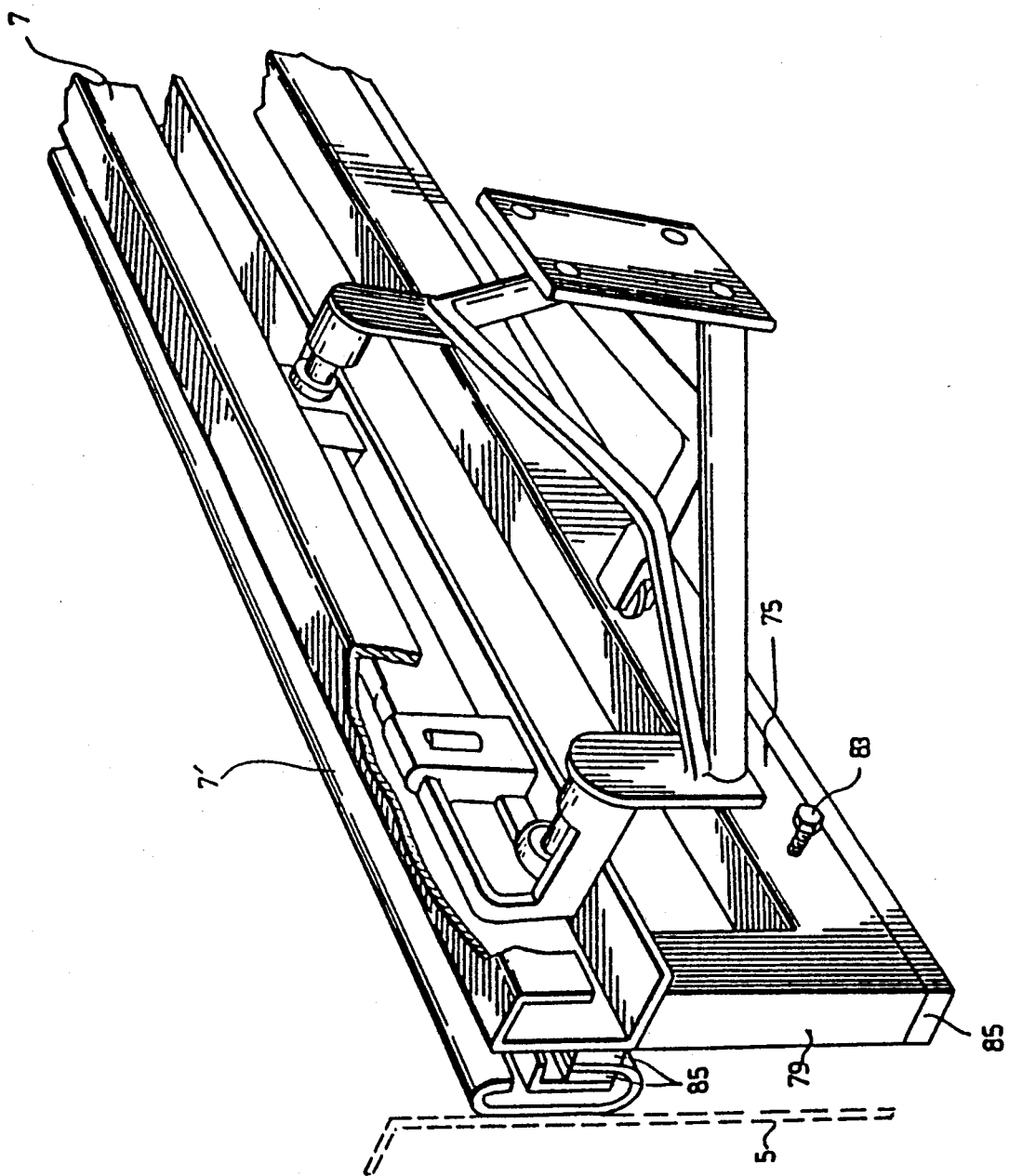
FIG. 4 is a view similar to that of FIG. 3, showing the use of a low wall incoporating the rail member.
Figure 5:
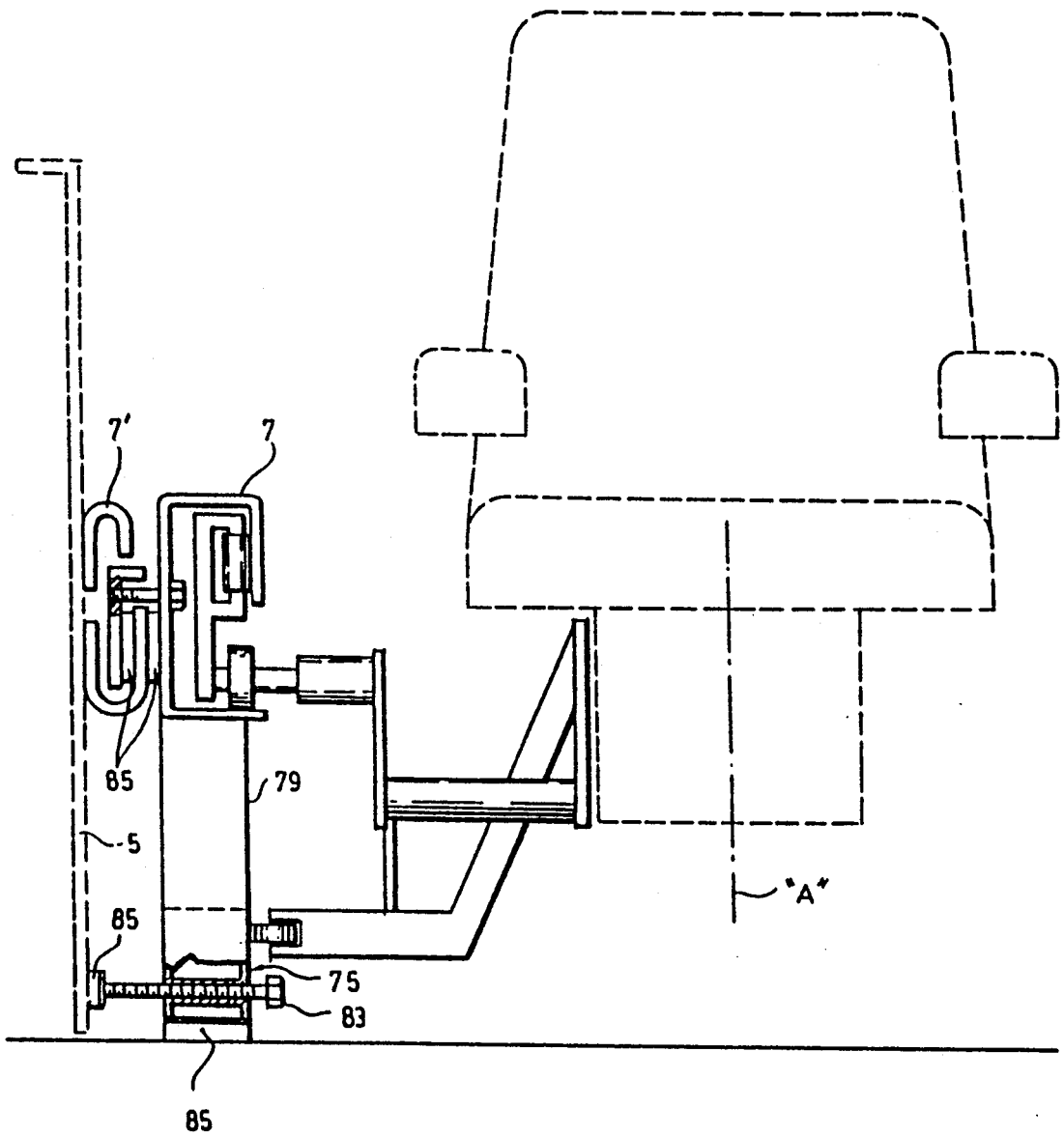
FIG. 5 is a schematic cross-sectional view similar to the one of FIG. 2, showing the attachment of the low wall shown in FIG. 3, to the vertical wall of a locomotive driver's cab.

As shown in FIGS. 4 and 5, the rail member 7 may be part of a frame assembly 71, hereinafter called "low wall", incorporating the rail member 7, a separate beam 73 extanding horizontally under the rail member and having a vertical front wall surface 75 of the same length as the rail member, and a set of vertical cross beams 77, 79 to structurally connect the beam 73 to the rail member.

The space 81 left between the rail member 7 and beam 73 is interesting inasmuch as it may give room to structural components that may be attached to the vertical wall 5, such as, for example, an electric heating board.

The low wall 71 can be fixed to the wall 5 with the same kind of brackets 31 insertable into an existing rail 7', and of bolt-and-nut assemblies 33 as were disclosed hereinabove. Spacing of the beam 73 with respect to the wall 5 can be maintained and adjusted by means of threadable bolts 83 whose tips may bear onto the wall 5.

Advantageously, layers 85 of anti-vibration material such as FABRICA can be positioned between the tips of the bolts 83 and the wall 5 and between the existing rail 7' and the rail member 7.

It should be understood however that the rail member 7 or the low wall 71 could also be fixed directly onto the wall 5, by rivets, bolts or welding.

The rail member 7 advantageously comprises a vertical rear web 35 fixable to the vertical wall 5 either directly or through the rail 7', the brackets 31 and the bolt-and-nut assemblies 33. It also comprises a lower flange 37 horizontally projecting from the vertical rear web 35, this lower flange acting as a horizontal rolling surface as will be explained hereinafter. The rail member 7 further comprises an upper flange 39 horizontally projecting from the rear web 35 in the same direction as the lower flange 37, and a vertical front web 41 downwardly projecting from the upper flange 39 away from the rear web 35. This vertical front web 41 is shorter in height than the vertical rear web 35, thereby leaving a gap 43 between its lower edge and the lower flange 37. In addition, it has a rear surface which acts as a vertical rolling surface as will be explained hereinafter.

The seat attachment assembly according to the invention also comprises a seat carrier 9 slidably mounted onto the rail member 7. The seat carrier 9 comprises a seat supporting member 11 on which the seat 3 to be attached to the wall 5 is pivotably mounted either directly or through some mechanism known per se, in such a manner as to be at least pivotable about a vertical axis A. In addition of making the seat 3 pivotable, the mechanism may also makes it forwardly or rearwardly tiltable and/or otherwise adjustable. The seat carrier 9 also comprises means for mounting the seat supporting member 11 and the seat 3 attached thereto onto the rail member 7 for horizontal displacement therealong at a given distance away from the vertical wall 5. As is better shown in FIG. 3, these mounting means comprise three supporting arms numbered 15 and 19, that are rigidly connected to the seat supporting member 11 by welding.

Two of these arms, numbered 15 in the drawings, project away from the seat supporting member 11 up to the rail member in a symmetrical manner. These two arms 15 have their ends spaced apart from each other and connected by a reinforcing brace 45.

The third arm 19 centrally projects away from the seat supporting member 11 down to the vertical wall 5. This third member 19 is preferably made of a piece of tubing of rectangular cross-section that can be connected to the two other arms 15 by other reinforcing braces 47.

Of course, the shape and length of the arms 15 and 19 are suitably selected to hold the seat supporting member 11 and the seat 3 connected thereto in a cantilever fashion away from the vertical wall 5 at any desired height from the floor.

In accordance with the invention, the mounting means also comprises rollers 49, 51 and 55 that are mounted at the free ends of the arms 15 and 19 in such a manner as to bear onto the rail member 7 and vertical wall 5 to vertically support the seat carrier 9 and seat 3 attached thereto and simultaneously hold the same in cantilever position. The rollers 49, 51 and 55 which preferably consist of bushings or, preferably, ball-bearings mounted on small shafts as is known per se, can be "divided out" into two different sets, namely:

a first set consisting of spaced apart rollers 49 each having a longitudinal axis perpendicular to the vertical wall 5, the rollers 49 of this first set, hereinafter called "horizontal rollers", being coaxially mounted at the free ends of the arms 15 and bearing vertically on the lower flange 37 of the rail member 7; and a second set consisting of two rollers 51 and one roller 55 each having a vertical axis, these rollers being hereinafter called "vertical rollers", the rollers 51 of this second set, being respectively mounted onto L-shaped supports 53 welded onto the free ends of the arms 15, whereas the roller 55 is mounted at the free end of the arm 9. As can be seen, the rollers 51 and 55 bear laterally onto the rear surface of the vertical front web 41 of the rail member 7 and onto the vertical wall 5, respectively, to hold the supporting member 11 away from the vertical wall 5.

Accordingly, each arm 15 carries one horizontal roller 49 and one vertical roller 51 mounted onto the L-shaped bracket 53, the rollers 49 and 51 being mounted and positioned in such a manner as to insertable through the gap 43 into the rail member 7, for free rotation over the horizontal and vertical rolling surfaces defined by the lower flange 37 and vertical front web 41. The arm 19 carries the other vertical roller 55 in such a manner as that it bears onto the vertical wall 5 and is free to rotate onto this wall.

As can be understood, the rollers 49, 51 and 55 allow horizontal adjustment of the seat 3 along the vertical wall 5 in a very smooth and easy manner.

To prevent the seat carrier 9 from inadvertantly sliding out of the rail member 7 at both ends thereof, use can be made of stopping means which may consist of a bolt or rod 57 fixed onto the lower flange 39 of the rail member 7 at each end thereof (see FIG. 3). Of course, at least one of these stopping means 57 must be removable in order to allow removal of the seat carrier 9 for the rail member 7 whenever desired, such as, for example, for maintenance purpose.

The attachment assembly 1 according to the invention further comprises means for locking the seat carrier 9 to a plurality of different locations along the rail member 7. These locking means can be of any type. However, they preferably include a perforated member 59 that can be welded on of the rail assembly 7 to extend parallel to the upper flange 39, and a pin assembly 61 including a spring-brased pin 63. The pin assembly 61 is connected to at least one of the arm 15 of the seat carrier, or, preferably, to the brace 45 through a rigid bracket 65, the pin 63 being removably engageable into any perforation 67 of the perforated member 59.

It must be understood that the invention is not restricted to the preferred embodiment described hereinabove and shown in the accompanying drawings. Indeed, various modifications could be made to this preferred embodiment withoug departing whatsoever from the scope of protection of the invention as defined in the appended claims.

What is claimed is:

1. A seat attachment assembly for use to attach a seat onto a vertical wall, said assembly comprising:

(a) an elongated rail member,
(b) means for rigidly fixing the rail member in horizontal position onto the vertical wall;
(c) a seat carrier slidably mounted onto said rail member, said seat carrier comprising:
a seat-supporting member on which the seat to be attached is pivotably mounted about a vertical axis, and
means for mounting said seat-supporting member onto said rail member for horizontal displacement therealong at a given distance away from said vertical wall, said mounting means including a first set of spaced apart rollers each having a longitudinal axis perpendicular to the vertical wall, the rollers of said first set, hereinafter called "horizontal rollers", bearing vertically on said rail member to vertically support the seat and seat carrier, and a second set of spaced apart rollers each having a vertical axis, the rollers of said second set, hereinafter called "vertical rollers", including rollers bearing laterally on said rail member and at least one roller bearing on a vertical surface extending under said rail member respectively so as to hold the supporting member in a cantilever manner at said given distance away from said vertical wall, and
(d) means for locking the seat carrier to a plurality of different locations along the rail member,
whereby, thanks to the rollers, horizontal adjustment of the seat along the vertical wall is easily achieved.

2. The assembly of claim 1, wherein the rail member (a) has a horizontal rolling surface and a vertical rolling surface facing the vertical wall, and wherein the mounting means of the seat carrier (c) comprises at least three supporting arms rigidly connected to the seat-supporting member, two of said arms projecting away from the seat-supporting member up to the rail member and having free ends spaced apart from each other and each carrying one of said horizontal rollers and one of said vertical rollers for free rotation over said horizontal and vertical rolling surfaces of said rail member, respectively each remaining arm projecting away from the seat-supporting member down to the vertical surface and having a free end carrying one of said vertical rollers for free rotation onto said vertical surface.

3. The assembly of claim 2, wherein the rail member (a) comprises:

a vertical rear web fixable to said vertical wall;
a lower flange horizontally projecting from the vertical rear web, said lower flange acting as said horizontal rolling surface;
an upper flange horizontally projecting from the vertical rear web in the same direction as said lower flange; and
a vertical front web downwardly projecting from said upper flange away from said rear web, said vertical front web being shorter in height than said vertical rear web to leave a gap for insertion of said one rollers, and having a rear surface acting as said vertical rolling surface.

4. The assembly of claim 3, wherein the locking means (d) includes a perforated member extending parallel to the said member and a pin rigidly connected to at least one of said arms of said seat-carrier, said pin being removably engageable into any perforation of said perforated member.

5. The assembly of claim 4, further comprising stopping means mounted onto said rail member to prevent said seat-carrier moving along from inadvertently sliding out of said rail member.

6. The assembly of claim 1, wherein the vertical wall is an internal wall of a locomotive driver's cab.

7. The assembly of claim 3, wherein the vertical wall is an internal wall of a locomotive driver's cab.

8. The assembly of claim 5, wherein the vertical wall is an internal wall of a locomotive driver's cab.

9. The assembly of claim 6, wherein the fixing means (b) comprises detachable brackets for fixing the rail member (a) to an already existing rail.

10. The assembly of claim 7, wherein the fixing means (b) comprises detachable brackets for fixing the rail member (a) to an already existing rail.

11. The assembly of claim 8, wherein the fixing means (b) comprises detachable brackets for fixing the rail member (a) to an already existing rail.

12. The assembly of claim 1, wherein the vertical surface on which at least one of said vertical rollers bears, is the vertical wall to which the rail member is fixed.

13. The assembly of claim 3, wherein the vertical surface on which at least one of said vertical rollers bears, is the vertical wall to which the rail member is fixed.

14. The assembly of claim 5, wherein the vertical surface on which at least one of said vertical rollers bears, is the vertical wall to which the rail member is fixed.

15. The assembly of claim 7, wherein the vertical surface on which at least one of said vertical rollers bears, is the vertical wall to which the rail member is fixed.

16. The assembly of claim 8, wherein the vertical surface on which at least one of said vertical rollers bears, is the vertical wall to which the rail member is fixed.

17. The assembly of claim 1, wherein:
the rail member is part of a low wall;
said low wall is fixed to said vertical wall by means (b) for rigidly fixing the rail member; and
the vertical surface on which one of said vertical rollers bears, is part of said low wall.

18. The assembly of claim 3, wherein:
the rail member is part of a low wall;
said low wall is fixed to said vertical wall by means (b) for rigidly fixing the rail member; and
the vertical surface on which one of said vertical rollers bears, is part of said low wall.

19. The assembly of claim 7, wherein:
the rail member is part of a low wall;
said low wall is fixed to said vertical wall by means (b) for rigidly fixing the rail member; and
the vertical surface on which one of said vertical rollers bears, is part of said low wall.

20. The assembly of claim 8, wherein:
the rail member is part of a low wall;
said low wall is fixed to said vertical wall by means (b) for rigidly fixing the rail member; and
the vertical surface on which one of said vertical rollers bears, is part of said low wall.

* * * * *